Figure 1:
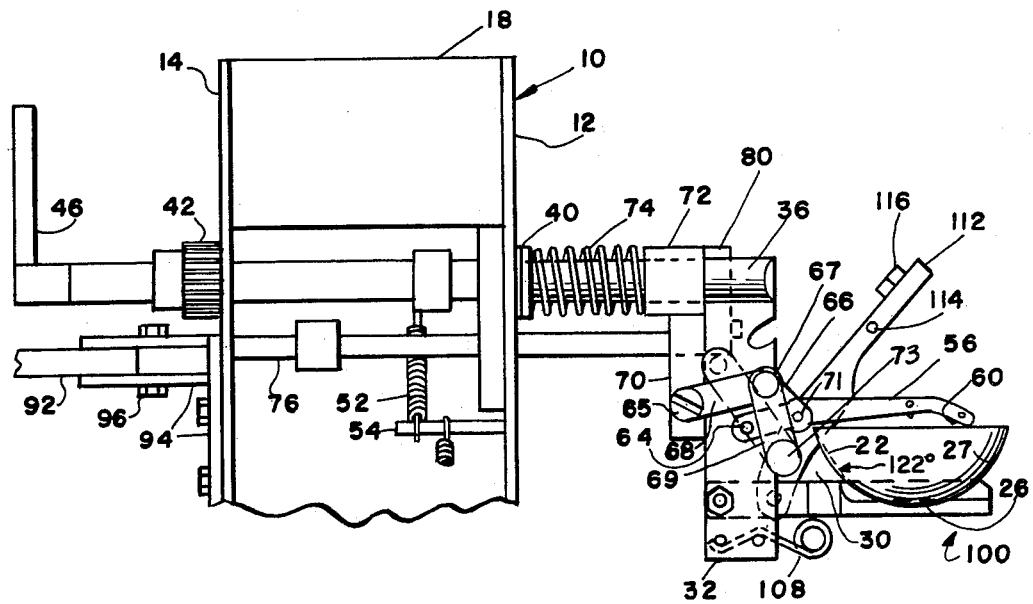

Aug. 3, 1965 L. SHELTON 3,198,569
EGG HOLDING MECHANISM
Original Filed Feb. 10, 1961 2 Sheets-Sheet 1

INVENTOR
Leonard Shelton

BY
Dressler, Goldsmith, Clement, Gordon & Lord
ATTORNEYS

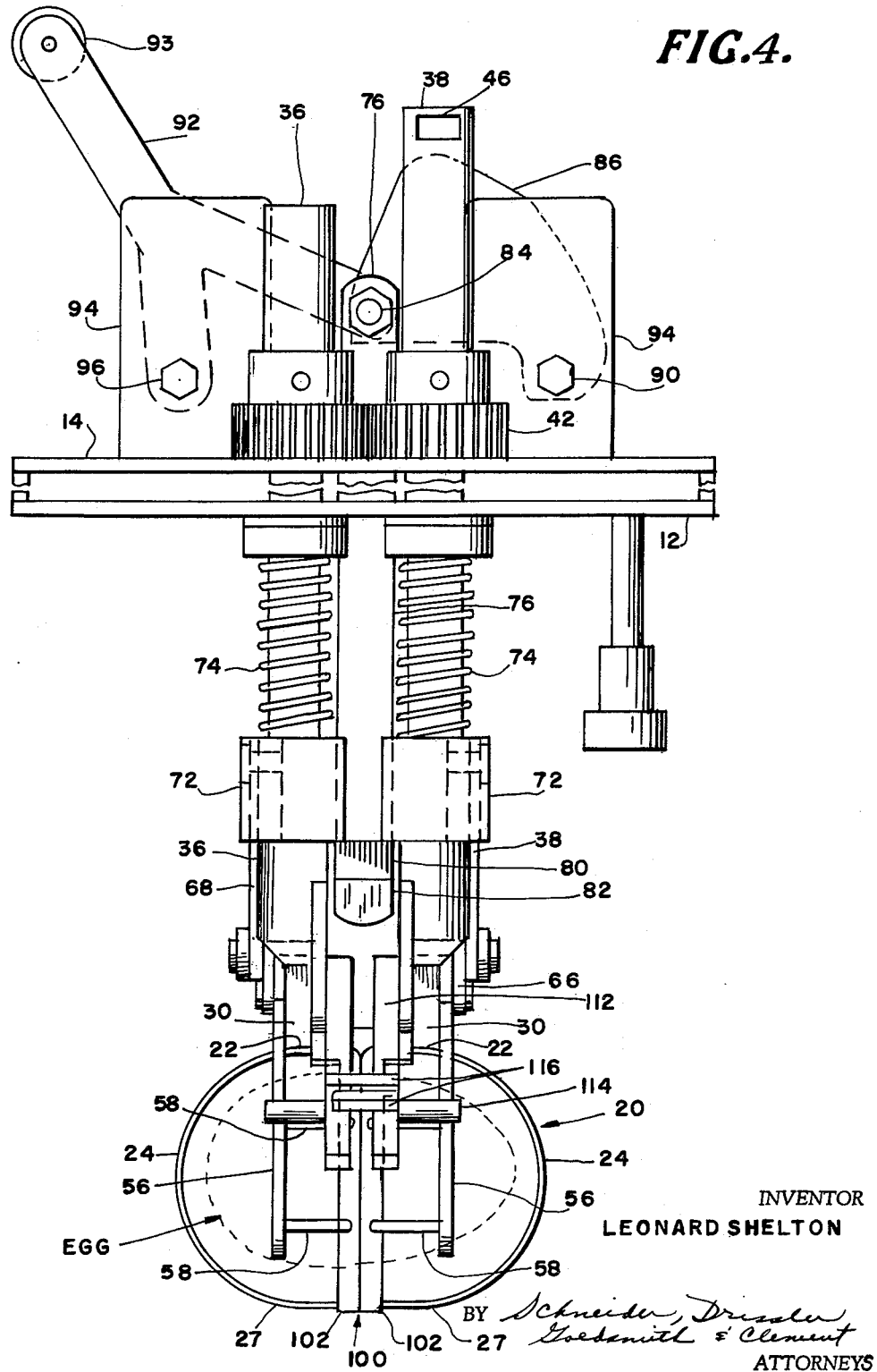

United States Patent Office
3,198,569
Patented Aug. 3, 1965

3,198,569
EGG HOLDING MECHANISM
Leonard Shelton, Omaha, Nebr., assignor to Continent Egg Corporation, Chicago, Ill., a corporation of Illinois
Original application Feb. 10, 1961, Ser. No. 88,395, now Patent No. 3,082,804, dated Mar. 26, 1963. Divided and this application Oct. 11, 1962, Ser. No. 230,317
4 Claims. (Cl. 294—104)

This application is a division of copending application Serial No. 88,395, filed February 10, 1961, entitled "Egg Breaking Mechanism," now Patent No. 3,082,804.

This invention relates to an apparatus for breaking eggs and separating the yolks, albumen and empty shells from each other. More in particular it relates to an apparatus for accomplishing these functions which has improved egg holding means and improved egg breaking means.

Machines which automatically break an egg and separate the yolk, albumen and shell from each other are known in the prior art. Known machines for accomplishing these functions basically comprise a clamping means for holding the whole unbroken egg, knife means for breaking the egg shell while being held in the clamping means and various containers located below the clamping means for accepting and separating the contents of the shell. The machine of the invention, while having some features in common with known machines, has many inprovements in the egg-holding means, egg-breaking means and the separating means which result in the rapid and efficient processing of large batches of eggs regardless of the range of size, shape and condition of the shell and the quality of the contents.

It is a primary object of this invention to provide an egg-holding means which positively holds an egg against all movement while at the same time exerts no crushing forces on the egg shell.

It is a further object of this invention to provide an egg-holding means which will accept in sequence eggs of different shape, size and shell condition.

It is a further object of this invention to provide an egg-holding and breaking means which efficiently cracks but does not shatter an egg shell.

The above objects are attained with the machine to be described hereinafter in detail. First, however, a brief description of the machine and its operation will be given. The primary components—an egg-holding means, a knife means, a yolk-receiving cup and an albumen-receiving cup—are mounted one below the other on a box-like frame consisting of a front plate 12, a rear plate 14, a bottom plate 16 and two short side plates 18. This combination together with the elements within the frame is hereinafter referred to as the breaking head 10.

Figure 2:
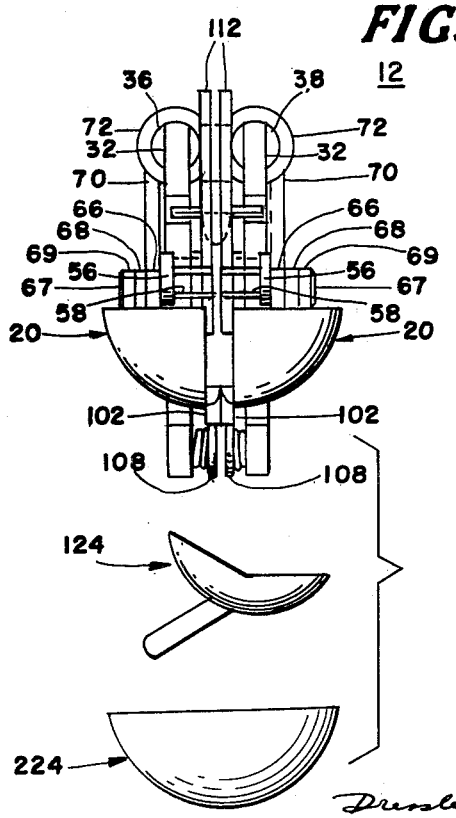
Figure 3:
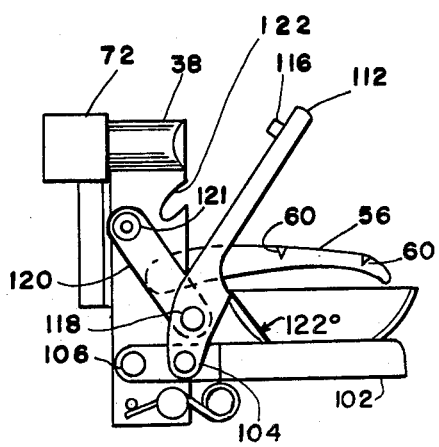

In the drawings:
FIGURE 1 is a fragmentary side elevation partly in section of the right side of the egg-breaking head of the invention.
FIGURE 2 is a fragmentary front elevation of the breaking head of FIGURE 1.
FIGURE 3 is an elevation of the right side of the left half of the egg-holding elements in FIGURE 1.
FIGURE 4 is a top plan view of the breaking head of FIGURE 1.

The egg-holding means of the invention comprises two slightly spaced half-cups 20 with concave surfaces facing each other and upwardly and two pivoted fingers 56 which can be lowered onto the top of an egg in the cavity formed between the half-cups 20. Each half-cup 20 and each finger 56 is attached to the end of one of two horizontal parallel shafts 36 and 38 so that rotation of the shafts in opposite directions will drop the egg contents by swinging the half-cups 20 and fingers 56 away from each other. The knife 100 comprises two half-blades 102 each of which is pivoted immediately below the half-cups. When the shafts are rotated so that the half-cups are adjacent each other, the two half-blades 102 are in contact with each other and form a knife 100 which can be snapped upwardly into the narrow space between the half-cups to crack the shell of an egg. After the shell is cracked by the knife, each shaft is rotated 90° in opposite directions so that the half-cups 20, fingers 56 and half-blades 102 separate and allow the yolk and white to drop by gravity to a yolk cup 124 which is directly below. Each half of the egg shell is held by a finger 56, a half-cup 20 and a half-blade 102 and is released later by movement of the finger 56 away from the half-cup 20. The yolk cup 124 is sized to hold only a yolk so that substantially all of the white either misses the yolk cup entirely or overflows from the yolk cup and drops into an albumin cup 224 which is directly below the yolk cup.

As shown in FIGURES 1 and 4 each half-cup 20 consists of a rear wall 22, side wall 24, a bottom wall 26 and a front 27. When the two half-cups 20 are in the egg-holding position, the concave surfaces of each half-cup face upwardly and toward the concave surfaces of the adjacent half-cup 20 so that an egg-holding cavity is formed. A horizontal section taken through the half-cups, the rear walls, side walls and front walls would form generally an ellipse, and a vertical section through the space between half-cups, the rear wall, bottom wall and front wall would form generally a semicircle. The rear wall of each half-cup 20 is, however, somewhat flattened and makes an angle of about 122° with the bottom wall. It has been found that this arrangement of bottom and rear walls is particularly advantageous because every egg, regardless of diameter, comes to a position at rest in the cavity which is optimum for the cracking operation by the knife 100. The half-cups 20 are of sufficient size to form a cavity which will readily hold a large egg. The exterior of each rear wall 22 of each half-cup 20 is welded to a horizontal projection 30 which is welded to the front vertical edge of a vertical support plate 32. The top of vertical support plate 32 is welded to the lower surface of the end portion of right horizontal shaft 36. Left horizontal shaft 38 similarly supports the other half-cup 20. Shafts 36 and 38 pass through holes in front plate 12 and rear plate 14 and are held in place by collar 40 and gears 42 which are held to the shafts by set screws. Each gear 42 meshes with the other so that rotation of one shaft results in opposite rotation of the other shaft. The rear end of left shaft 38 terminates in cam 46 which is an upwardly projecting arm rigidly attached to the rear end of left shaft 38. Half-cups 20 can be moved apart by a cam on a stationary cam shaft which rotates cam 46 90° so that shafts 38 and 36 and the elements attached thereto rotate 90° in opposite directions. When the stationary cam releases cam 46, the shafts 38 and 36 are returned to their original position by spiral spring 52 attached at one end to a collar on shaft 38 and at the other end to pin 54 mounted on front plate 12.

Associated with each half-cup 20 is an egg-holding finger 56 which rotates through an arc about pivot pin 64 which pivotally connects the inner end of finger 56 with vertical support plate 32. Each finger 56 has two spaced lateral projections 58, the free ends of which have downwardly projecting points 60. When fingers 56 are in an up position, an egg can be placed in the cavity between adjacent half-cups 20. When the fingers 56 are lowered, the points 60 come into contact with the upper surface of the egg and hold the egg in position in the cavity. Fingers 56 are caused to pivot about a pivot pin 64 by operation of a cam-operated push rod 76 which actuates links 66, 68 and 69. As shown in FIGURES 1 and 5, a single push rod 76 passes through the breaking head 10. The rear end of push rod 76 is provided with a horizontal slot in which a cock lever 92 and a crack lever 86 are pivoted by a vertical bolt 84. Cock lever 92 is pivotally supported by a bolt 96 on a bracket 94 which is attached to the rear plate 14 of the breaking head 10. The rear end of cock lever 92 is provided with a roller 93 which engages a cam. When push rod 76 moves rearwardly as a result of movement of cock lever 92, a vertical projection 80 on the front end of push rod 76 engages the edges of sleeves 72 which are slidably mounted on shafts 36 and 38. Continued rearward movement of push rod 76 moves sleeves 72 rearwardly against spiral springs 74. Rigidly attached to each sleeve 72 is a downwardly projecting fin 70 to which the rear end of link 68 is pivoted by a bolt 65. Link 68 is pinned at its front end to the upper end of link 69 and to the upper end of link 66 by a pin 67. The lower end of link 66 is pivoted to finger 56 forwardly of pin 64 by a pin 71. The lower end of link 69 is pivoted to horizontal projection 30 on support plate 32 by a pin 73. Rearward movement of sleeve 72 and fin 70 by the push rod 76 tends to straighten the linkage formed by links 66 and 68 with the result that the outer end of link 66 moves upwardly in an arc and carries with it finger 56.

The linkage formed by links 66, 68 and 69 performs two critical functions when sleeve 72 and fin 70 are being returned to their at-rest position by spring 74. Firstly, the linkage is so interconnected that a very small percentage of the force exerted by spring 74 is transmitted to finger 56 after push rod 76 releases the sleeve 72. As a result finger 56 contacts an egg shell with practically no crushing force. This function is particularly important when the egg has an unusually thin shell or when the egg shell is unusually fragile as a result of having been slightly cracked during previous handling. It has been found that even eggs which have been cracked to the extent of having albumen leaking from them can be gripped by the fingers without being further cracked. Secondly, the linkage acts as a friction lock which prevents upward movement of finger 56 by any force except that applied by push rod 76. That is, after push rod 76 has been released, finger 56 is free to pivot downwardly but is locked by links 66, 68 and 69 against upward movement. As a result, once a finger 56 engages its points 60 with an egg there is little possibility that the egg will change its position in the cavity formed by half-cups 20.

Since each finger 56 is pivoted independently, the pairs of points 60 engage the top of an egg independently. Thus, each pair of points 60 settle gently and positively into contact with the shell of the egg regardless of the shape or size of the egg. In FIGURE 4 the position of an egg relative to fingers 56 is shown in dotted lines.

The egg-breaking knife 100 and associated linkages are shown in FIGURES 1–4 in an uncocked or egg-breaking position. The knife 100 consists of two half-blades 102 each of which is pivoted at its rear end to the inner surface of the support plate 32 by a bolt 106. When the half-cups 20 are in an egg-holding position as shown, for example, in FIGURE 2, half-blades 102 engage each other along their longitudinal opposed surfaces. The egg-breaking knife 100 thus formed is free to swing into and out of the space between the half-cups 20 under the action of a linkage to be described next.

A cocking arm 112 is pivoted at its lower end to each half-blade 102 by a pin 104 located forwardly of pivot bolt 106. A link 120 is pinned at its lower end to cocking arm 112 by pin 118 and at its upper end to the inner surface of the vertical support plate 32 by a pin 121. Each cocking arm 112 has a laterally and outwardly projecting pin 114 located toward its forward end. When fingers 56 are raised by actuation of cocking lever 92, the top of the fingers engage the lower surfaces of pins 114. Continued upward movement of fingers 56 results in an upward and rearward force on pins 114. Cocking arm 112 is moved by this force so that pins 114 swing into notches 122 in support plates 32 as seen in FIGURE 8. Movement of cocking arm 112 also causes half-blades 102 to pivot downwardly and rearwardly about pivot bolt 106 and against the opposing action of spring 108 also as seen in FIGURE 8. When each pin 114 reaches its position in notch 122 the position of cocking arm 112, link 120 and half-blade 102 is such that these pieces remain in position, hereinafter referred to as the cocked position, when the upward force exerted by fingers 56 is removed.

The egg-breaking movement of knife 100 is initiated by forward movement of push rod 76. A dog projecting from a stationary cam shaft will engage crack lever 86 (FIGURE 4) which is pivoted by a bolt 98 to bracket 94 on the rear plate 14 of the breaking head 10. Pivotal movement of crack lever 86 results in a forward force on bolt 84 and forward movement of push rod 76. The forward end of push rod 76 terminates in a short horizontal nub 82 on vertical projection 80. As push rod 76 moves forward, nub 82 engages the top pieces 116 on cocking arms 112. One end of each top piece is welded to a different cocking arm 112 and the free end rests on top of the other cocking arm 112. Thus, when nub 82 presses forwardly on top pieces 116, equal forces are exerted on each cocking arm 112 and both arms 112 are given a slight forward movement. This slight movement results in an uncocking of the linkage between cocking arm 112, half-blade 102, link 120 and associated pins so that the spring 108 snaps the half-blade 102 into the egg-breaking position shown in FIGURE 1. Since the uncocking movement of both cocking arms 112 is simultaneous, the two half-blades 102 forming knife 100 are snapped simultaneously into the breaking position between the adjacent bottom walls 26 of the half-cups 20.

The snapping of knife 100 into the approximate middle of an egg resting in the half-cups 20 cracks the shell of the egg along its entire small circumference. Fingers 56 hold their points 60 in contact with the top of egg and prevent any movement of the egg so that a positive, uniform, non-shell-shattering blow is always delivered by the knife 100 to the egg. The points 60 on fingers 56 continue to grip the shell after cracking, two points 60 engaging each half of the shell and holding it in its associated half-cup 20. As the breaking head 10 moves to the next position around the stationary cam shaft, a cam will cause opposite rotation of shafts 36 and 38 as described above. Each set of half-blades 102, half-cups 20, fingers 56, cocking arms 112 and their associated linkages are thereby caused to separate 180° from the other set. Each half of the egg shell remains held in its associated half-cup 20 and the contents of the egg fall freely into the cups below.

While a complete embodiment of the invention has been shown and described, it is to be understood that the invention is not limited to the details of construction disclosed by way of illustration, as these may be changed and modified in form and arrangement by those skilled in the art without departing from the scope of the invention which is limited only by the appended claims.

I claim:

1. An egg holding and clamping assembly for positively holding an egg in position to be cut open including an egg cup comprising two laterally spaced cup halves, each cup having a concave side wall, a concave front wall, a concave bottom wall and a forwardly extending substantially flat rear wall, clamping means for clamping an egg in position in said cup including independently movable clamping fingers adapted to engage the upper surface of the egg in each cup half whereby an egg is clamped between a clamping finger and the bottom wall in a least one egg cup half.

2. A holding device for eggs to be broken comprising two laterally spaced cup halves, each cup half having a concave side wall, a concave front wall, a concave bottom wall, and a forwardly extending substantially flat rear wall, means for supporting said cup halves in laterally spaced relationship with said side walls opposing each other to form a cup-shaped recess whereby eggs of substantially all sizes and shapes are properly held in said holding device.

3. An egg holding device as set forth in claim 2 in which the bottom wall of each cup half is dish-shaped and meets the rear wall at an angle on the order of 122°.

4. An egg holding and clamping assembly comprising two complementary assemblies, said complementary assemblies including a pair of cup halves, a pair of clamping fingers for clamping an egg in position, each of said clamping fingers overlying a separate cup half and being positioned to clamp the portion of the egg in the respective cup half, a pair of shafts, a sleeve surrounding each shaft, means interconnecting said sleeves with the respective fingers including friction lock means for preventing each of said fingers from moving away from its respective portion of the egg, and spring means acting against each of said sleeves to move each finger independently into clamping engagement with its respective portion of the egg.

References Cited by the Examiner

UNITED STATES PATENTS

| 66,492 | 7/67 | Hellen | 294—104 X |
| 2,314,741 | 3/43 | Sigler | 146—2.4 |
| 2,834,629 | 5/58 | Williams | 294—106 X |

FOREIGN PATENTS 736,945 of 1955 Great Britain.

GERALD M. FORLENZA, *Primary Examiner.*

ERNEST A. FALLER, SAMUEL F. COLEMAN,
*Examiners.*